United States Patent [19]

White

[11] Patent Number: 4,815,278

[45] Date of Patent: Mar. 28, 1989

[54] ELECTRICALLY DRIVEN FUEL PUMP FOR GAS TURBINE ENGINES

[75] Inventor: Robert C. White, La Mesa, Calif.

[73] Assignee: Sundstrand Corporation, Rockford, Ill.

[21] Appl. No.: 108,439

[22] Filed: Oct. 14, 1987

[51] Int. Cl.$^4$ ............................................. F02C 9/30
[52] U.S. Cl. ................................. 60/39.281; 417/42
[58] Field of Search .................. 60/39.281; 417/22, 42

[56] References Cited

U.S. PATENT DOCUMENTS

| | | | |
|---|---|---|---|
| 2,644,300 | 7/1953 | Waterman et al. | 60/39.281 |
| 3,596,467 | 8/1971 | Avery | 60/39.281 |
| 3,618,315 | 11/1971 | Avery | 60/39.281 |
| 3,620,010 | 11/1971 | Davis | 60/39.281 |
| 3,908,360 | 9/1975 | Meyer et al. | 60/39.281 |
| 3,985,468 | 10/1976 | Lewis | 417/214 |
| 4,004,412 | 1/1977 | Burnell | 60/39.281 |
| 4,208,871 | 6/1980 | Riple | 60/39.281 |
| 4,697,238 | 9/1987 | Barbeau | 60/39.281 |

*Primary Examiner*—Louis J. Casaregola
*Attorney, Agent, or Firm*—Antonelli, Terry & Wands

[57] ABSTRACT

An improved electrically driven fuel control system for a gas turbine engine is disclosed. The system utilizes a combination of variation in power applied to an electrically powered drive of a positive displacement fuel pump and braking to achieve an optimized response characteristic approaching that of mechanically driven fuel systems directly driven from the gas turbine engine. In the preferred embodiment, for a decrease in fuel delivery exceeding a predetermined limit control of the electric drive for the fuel pump is achieved by braking. For decreases in fuel delivery having a magnitude less than the predetermined limit and for fuel increases, control is achieved by varying the power applied to the electric drive for the fuel pump.

12 Claims, 7 Drawing Sheets

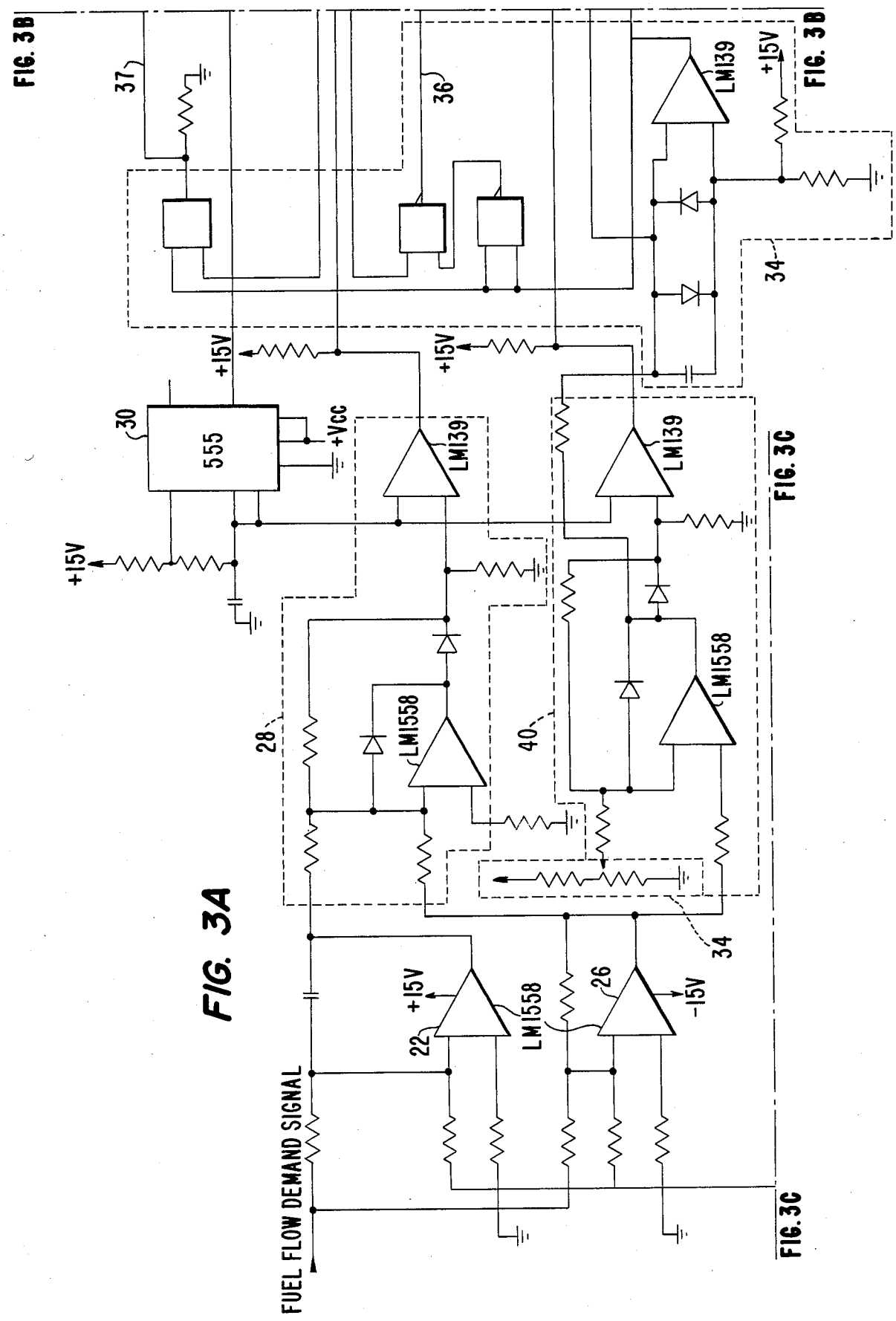

ELECTRICALLY DRIVEN FUEL PUMP FOR GAS TURBINE ENGINES

BACKGROUND OF THE INVENTION

1. Field of the Invention

The present invention relates to controls for electrically driven fuel pumps for gas turbine engines where precise tracking of fuel demand signals is essential. More specifically, the invention relates to controls for electrically driven fuel pumps for gas turbines which drive constant frequency generators.

2. Description of the Prior Art

Fuel pumps for gas turbine engines are known which utilize electrically driven elements to supply the fuel to the gas turbine. See U.S. Pat. Nos. 4,344,141, 4,423,592, 4,432,201, 4,441,156, and 4,625,510. Because of the fact that the speed of an electrically driven fuel pump for a gas turbine engine does not vary directly with the power load of the turbine, it has been difficult to provide a response characteristic in an electrically driven fuel pump for a gas turbine engine which has as an optimized overall performance characteristic.

SUMMARY OF THE INVENTION

The present invention provides an improved electrically powered fuel pump control for a gas turbine engine having a response characteristic approaching that of controls which are mechanically driven by a power takeoff. In accordance with the invention, increased demands for fuel are satisfied by increasing the power supplied to the electrically powered fuel supply in direct proportion to the desired amount of increase, decreased demands for fuel less than a predetermined rate of fuel decrease are satisfied by decreasing the power supplied to the electrically driven fuel supply in direct proportion the desired amount of decrease; and decreased demands for fuel greater than the predetermined rate of decrease are satisfied by applying a braking function to the electrically driven fuel supply.

An electrically powered fuel control for a gas turbine engine in accordance with the invention includes an electrically powered fuel supply for providing fuel to the gas turbine engine, the fuel supply providing an increased fuel supply to cause the engine to produce more power and a decreased fuel supply to cause the engine to produce less power; a fuel demand control for specifying fuel demand for the engine to selectively cause the increased fuel supply to the engine and the decreased fuel supply to the engine, the fuel demand control producing a fuel flow demand signal which is proportional to the specified fuel demand; a velocity sensor for producing a velocity signal which is proportional to a sensed velocity of a moving element in the electrically powered fuel supply; a braking function for braking the rate of delivery of fuel by the electrically powered fuel supply in response to a braking signal; and a controller, responsive to the velocity signal and the fuel flow demand signal for producing a power signal applied to the electrically powered fuel supply for applying power causing the electrically powered fuel supply to increase the rate of delivery of fuel delivered to the engine in response to the fuel demand control specifying an increase in the rate of delivery of fuel to the engine and for applying power causing the electrically powered fuel supply to decrease the rate of delivery of fuel delivered to the engine in response to the fuel demand control specifying a decrease in the rate of delivery to the engine less than a predetermined rate of decrease of fuel demand, and for producing the braking signal for causing the electrically powered fuel supply to be braked by a braking function to decrease the rate of delivery of fuel to the engine in response to the fuel demand control specifying a decrease in the rate of delivery of fuel greater in magnitude than a predetermined rate of decrease of fuel demand.

Preferably, the braking function is a regenerative braking function which may be implemented by the electric motor, driving the fuel pump, being operated as a generator of electricity. When the braking function is regenerative, a switch and electrical load is applied to the output of the electric motor to dissipate the electrical energy generated by the electrical motor being operated as a generator.

For increases in the rate of delivery of fuel, the controller includes a pulse-width modulator, responsive to the velocity signal and the fuel flow demand signal, for supplying the power signal to the electrically powered fuel supply with the power signal being comprised of a series of pulses which repeat at a given frequency and have a width which is proportional to the difference between the fuel flow demand signal and the velocity signal and an integral thereof. Furthermore, for decreases in the rate of delivery of fuel less than the predetermined rate of decrease in the rate of delivery of fuel, the pulse width modulator produces pulses of the power signal having a width which is proportional to the difference between the fuel flow demand signal and the velocity signal and an integral thereof. The maximum rate of increase of fuel delivery is produced by the power signal being continually in an "on" state.

The controller further includes a pulse-width modulator for supplying the braking signal to the braking function with the braking signal being comprised of a series of pulses which repeat at a given frequency and have a width which is proportional to a difference between the reduced fuel flow demand signal and the velocity signal for rates of decrease greater than the predetermined rate of decrease of fuel delivery. The maximum rate of braking may be produced by the braking signal being continually in an "on" state.

As used herein, the terminology "predetermined rate" means the rate at which the pump and its electrically powered drive deaccelerates when electrical power is removed.

BRIEF DESCRIPTION OF THE DRAWINGS

FIGS. 3A-C illustrate an electrical schematic of a preferred implementation of the pump controller of FIG. 1 in accordance with the present invention.

DESCRIPTION OF THE PREFERRED EMBODIMENT

Figure 1:
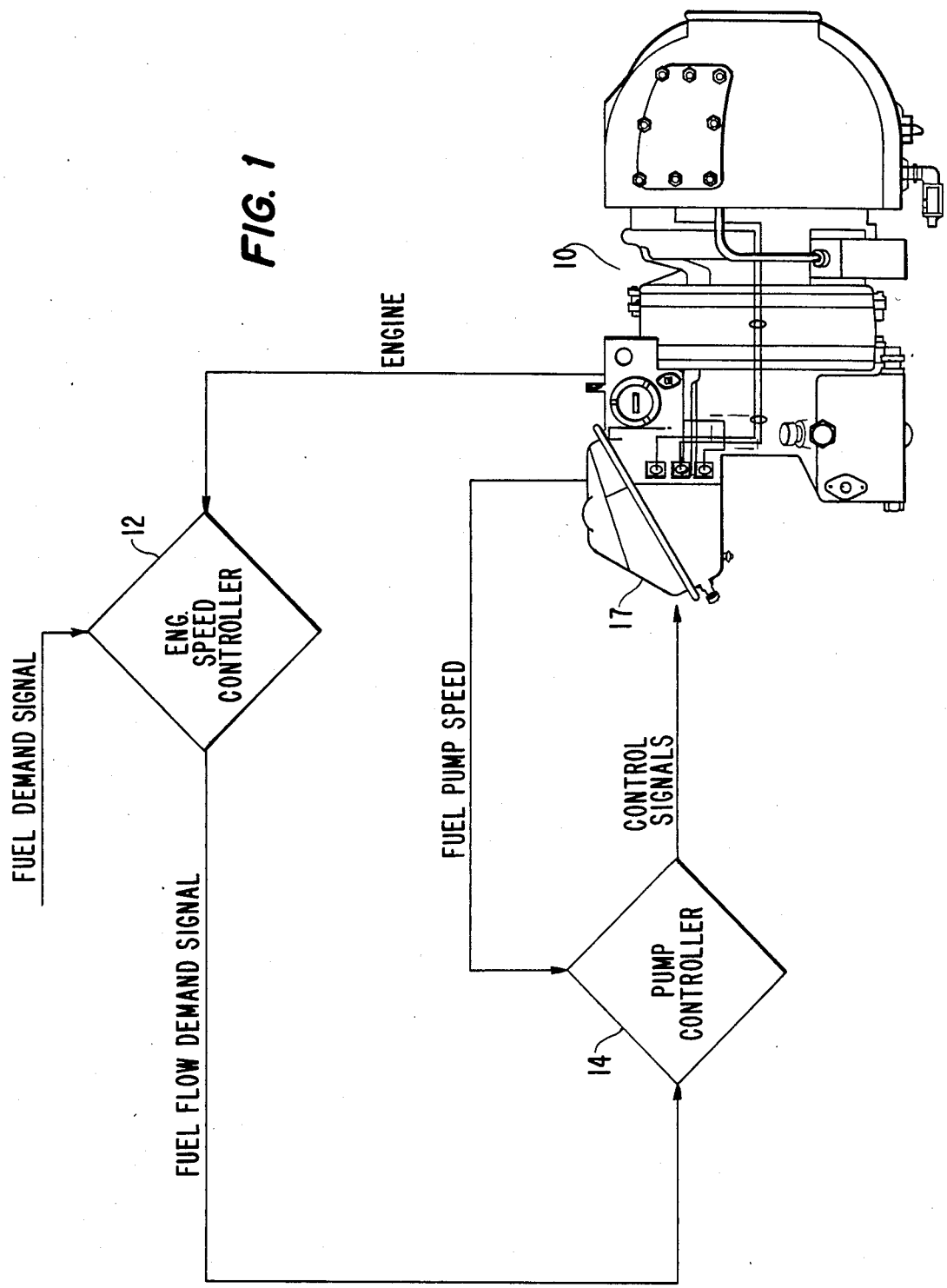
FIG. 1 illustrates a block diagram of a gas turbine engine including an electrically powered fuel pump and control in accordance with the present invention.

FIG. 1 illustrates a diagram of a conventional gas turbine engine 10 having a control and electrically powered fuel pump in accordance with the present invention. The gas turbine engine 10 may be any conventional gas turbine engine including those used for driving auxiliary power units or small thrust engines which have no gear box. The engine has an outside control loop comprised of an engine tachometer (not illustrated), a speed controller 12 which applies a fuel flow demand signal to a pump controller 14 and an electrically driven positive displacement pump 17. The speed controller 12 is conventional in the art and is used for generating a fuel flow demand signal in response to an engine speed signal produced by the tachometer by sensing the speed of a rotating element in the gas turbine engine and a fuel demand signal. The fuel flow demand signal controls the rate at which fuel is delivered to the engine including an increased fuel supply to cause the engine 10 to produce more power and a decreased fuel supply to cause the engine to produce less power in accordance with known control techniques. The engine has an inside control loop comprised of a tachometer 25 (element 18 of FIG. 2), pump controller 14 and the electrically driven positive displacement pump 17. Pump controller 14 is responsive to the output signal produced by the tachometer which senses the speed of the electrically driven fuel pump and the fuel flow demand signal. The output of the pump controller 14 is applied to the electrically powered motor driven fuel pump 17.

Figure 2:
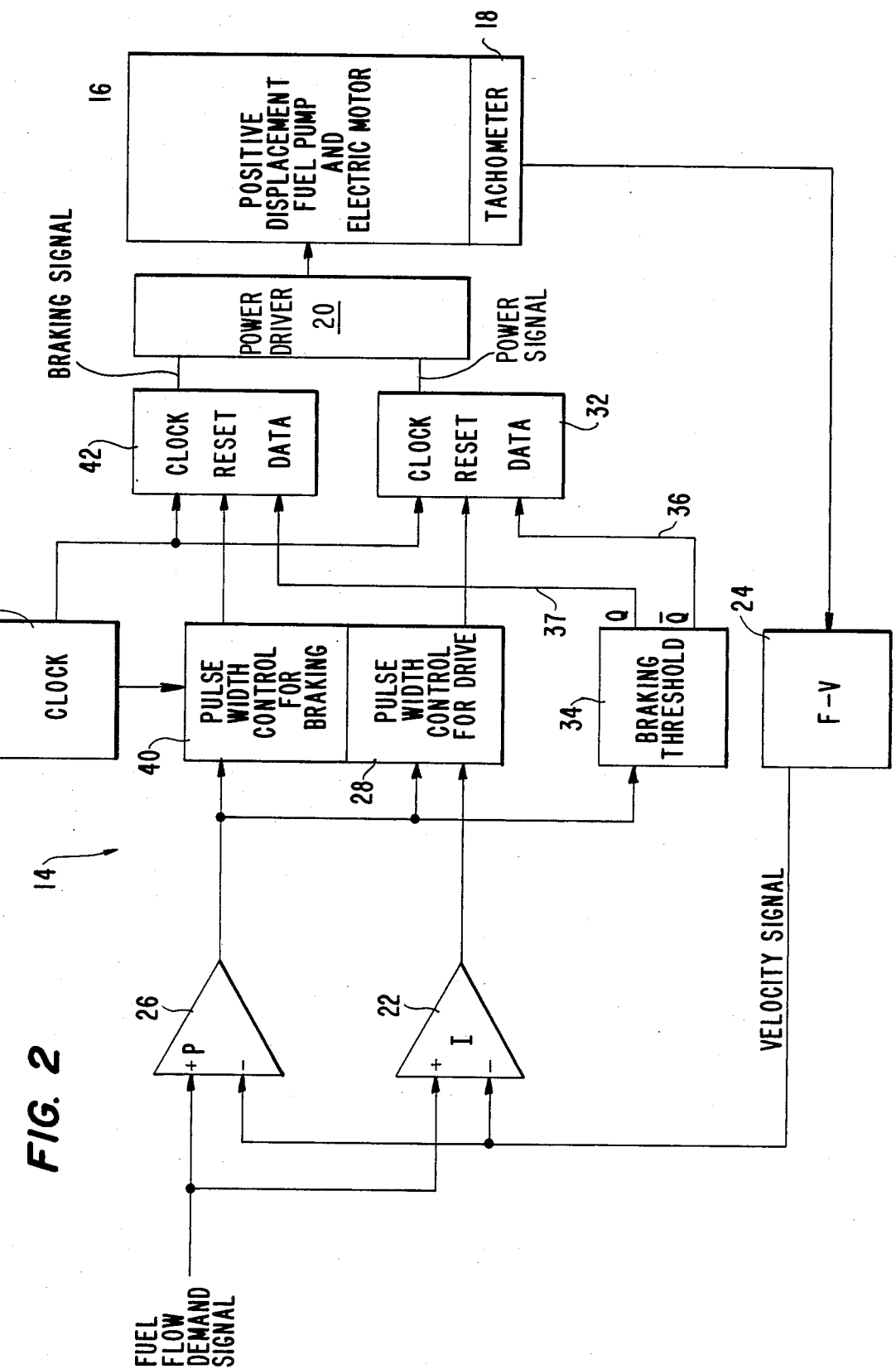
FIG. 2 illustrates a block diagram of an electrically powered fuel control in accordance with the present invention.

FIG. 2 illustrates a block diagram of the pump controller 14, positive displacement fuel pump and electric motor 16. The pump controller 14 is responsive to the fuel flow demand signal produced by the engine speed controller 12 of FIG. 1 and a fuel pump speed signal produced by a tachometer 18 which represents fuel flow. The positive displacement fuel pump and electric motor 16 is driven by a power driver 20. The power driver 20 is driven by a power signal and a braking signal and applies an output signal to the positive displacement fuel pump and electric motor to cause operation in either a power or braking mode as described below. The gain of the power signal and the gain of the braking signal may be varied with respect to each other. In the embodiment illustrated in FIG. 3, the power driver 20 applies a gain to the power signal twice the gain of the braking signal. The braking signal controls a regenerative braking function, associated with the electric motor of the positive displacement fuel pump and electric motor 16, to brake the rate of rotation thereof in direct proportion to a braking signal. The braking signal is applied when the required rate of decrease of the rate of delivery of fuel to the gas turbine is greater than a predetermined rate of decrease (FIG. 4, line segment C-D). The power signal controls the level of power applied to the electric motor of the positive displacement fuel pump and electric motor. When it is desired to increase the rate of delivery of fuel to the gas turbine from any current level, the level of power applied to the electric motor is increased in direct proportion to the desired rate of increase of fuel to be delivered to the gas turbine 10. For increasing the rate of fuel delivered to the gas turbine 10, the gain of the drive signal applied to the electric motor of the positive displacement fuel pump and electric motor 16 must be relatively high (FIG. 4, line segment EB) to provide rapid response to insure a high rate of acceleration. Furthermore, for a required rate of decrease in the rate of fuel delivered to the gas turbine which is less than the predetermined rate in decrease in rate of fuel, defining the onset of the activation of the brake 20, the power level of the drive signal is decreased in direct proportion to the commanded rate of decrease in the fuel flow demand signal (FIG. 4, line segment DE).

The circuitry for controlling the generation of the power signal is described as follows. For a rate of decrease in the delivery of fuel less than the predetermined rate of decrease of fuel delivery and for all rates of increase in fuel delivery (FIG. 4, line segment DB), the pulse width control 28 outputs pulses having a width directly proportional to the sum of the output signals from the integrator 22 and the proportional amplifier 26 with the pulses ceasing at point D of FIG. 4 as described below and increasing in width when moving away from point D in the section DB of FIG. 4. The integrator 22 integrates the difference between the fuel flow demand signal produced by the engine speed controller 12 and the output of a frequency-to-voltage converter 24 which produces an output velocity signal having a DC level directly proportional to the frequency of the pulses outputted by the tachometer 18. The frequency-to-voltage converter 24 may be a conventional integration circuit or other known circuits. A proportional amplifier 26, which may be a differential amplifier, produces an output signal proportional to the difference between the fuel flow demand signal produced by the engine speed controller 12 and the output velocity signal from the frequency-to-voltage converter 24. A pulse width controller 28 produces an output pulse train having pulses with a width which varies directly in proportion to the difference between the sum of the output signals from the integrator 22 and the proportional amplifier 26. A clock 30 supplies an output clock signal which is used to synchronize the time base of the pulse width control 28 so that the output signal produced by the pulse width control 28 is at the same rate as the output from the clock 30. A flip-flop circuit 32, which may be a conventional D-type flip-flop, is used to produce the pulse width modulated power signal applied to the power driver 20 which drives the electric motor of the positive displacement fuel pump and electric motor 16. A braking threshold circuit 34 produces a pair of output signals having opposite states Q and $\overline{Q}$ which change state each time the output of the proportional controller 26 passes through zero. The braking threshold circuit 34 may be a zero crossing detector. The output signal $\overline{Q}$ is applied by line 36 to the data input of the flip-flop 32. The output from the flip-flop 32 can be high as long as $\overline{Q}$ is high. The output of the clock 30 clocks the flip-flop circuit 32. The output signal from the pulse width control 28 determines the point at which the power signal is reset during each cycle of the clock signal as described below. The output drive signal from the flip-flop circuit 32 is continually "on" for fuel flow demand signals which specify a maximum increase in the rate of fuel to be delivered. When the output $\overline{Q}$ from the braking threshold circuit 34 is high, the duration of the individual pulses outputted by the flip-flop 32 is proportional to the duration of the pulses outputted by the pulse width control 28. The duration of each pulse outputted by the pulse width control is equal to the time between the output pulse from the clock 30 going high and the output of the pulse from the pulse width control 28 going high.

The braking function of the invention is produced by the following elements of FIG. 2. For all rates of decrease in the rate of delivery of fuel greater than the predetermined rate of decrease (FIG. 4, line segment CD), the pulse width control 40 outputs pulses having a width directly proportional to the output of the proportional amplifier 26 with the pulses ceasing at point D of FIG. 4 and increasing in width when operating at points moving away from point D in section CD of FIG. 4. The signal, which is proportional to the difference between the fuel flow demand signal and the velocity signal, outputted by proportional controller 26, is applied to the pulse width control for braking 40 which produces an output series of pulses which have the same basic repetition rate as the output pulses produced by clock 30. As described above, the width of the pulses is directly proportional to the difference between the fuel flow demand signal and the velocity signal. Flip-flop 42, which is identical to flip-flop 32, functions to output the braking signal for the brake 20. Preferably, the braking function is implemented as a regenerative brake. However, it should be understood that the invention may be practiced with a brake associated with the positive displacement fuel pump and electric motor. As is known, an electric motor may be operated as a brake by converting its function into a generator which takes power out of the system being braked by dissipation of the generated electrical power. Preferably, when the braking function is implemented by regenerative braking, a field effect transistor, to which the pulse train of the braking signal is applied to selectively short circuit the source to drain path in series with a resistor, is connected to the electric motor to cause generated current to flow through the field effect transistor and an associated resistor for a duration directly proportional to the duration of the pulses of the braking signal. The magnitude of the braking applied to the fuel pump when the electric motor is operated as a generator is directly proportional to the duration of the pulses outputted by the flip-flop circuit 42. When the output signal Q from the braking threshold circuit 34 is high, the duration of the individual pulses outputted by the flip-flop circuit 42 is proportional to the duration of the pulses outputted by the pulse width control 40. The duration of each pulse is equal to the time duration between the output from the clock 30 going high and the output pulse from the pulse width control 40 going high. The output Q from the braking threshold circuit 34 is applied by line 37 to the data input of flip-flop 42. The output of the flip-flop 42 can be high as long as Q is in the high state.

The predetermined point D of FIG. 4 at which the power signal and the braking signals begin to output pulses to the power driver 20 is determined by various system parameters. The overall fuel flow characteristic of the gas turbine during increases and decreases in power and the inertia and capacity of the pump determine effectively where the point D is located along the X axis. The invention is neither limited to any particular fuel flow system nor to the choice of a particular rate of increase or decrease of fuel represented by line segment CB.

Figure 3B:
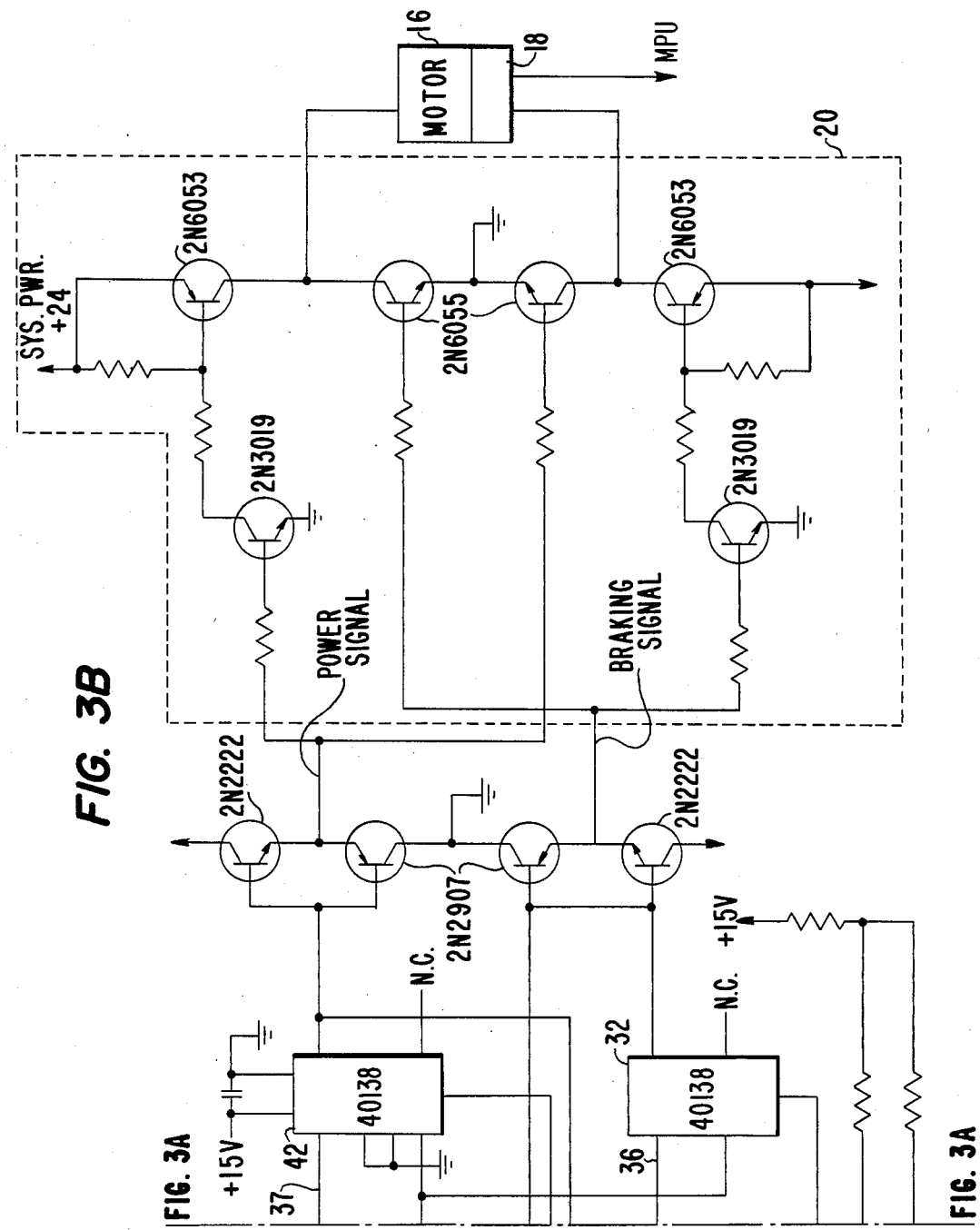
Figure 3C:
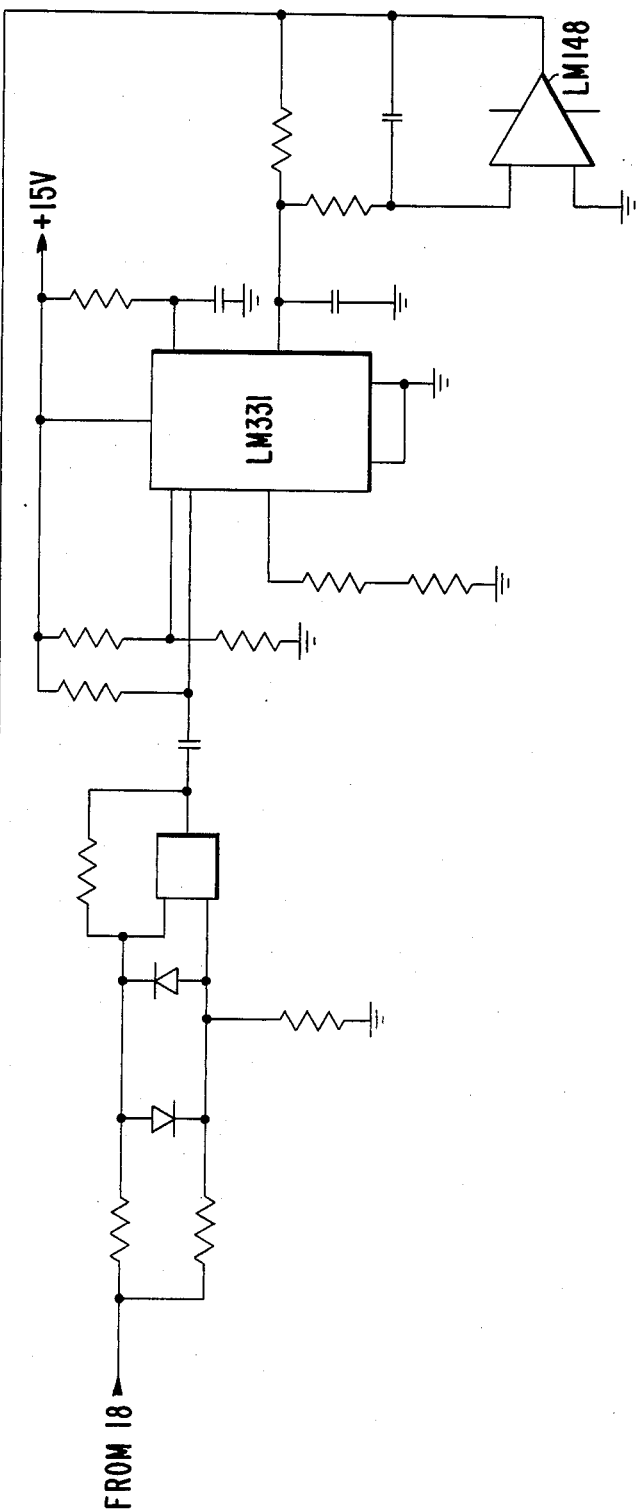
Figure 4:
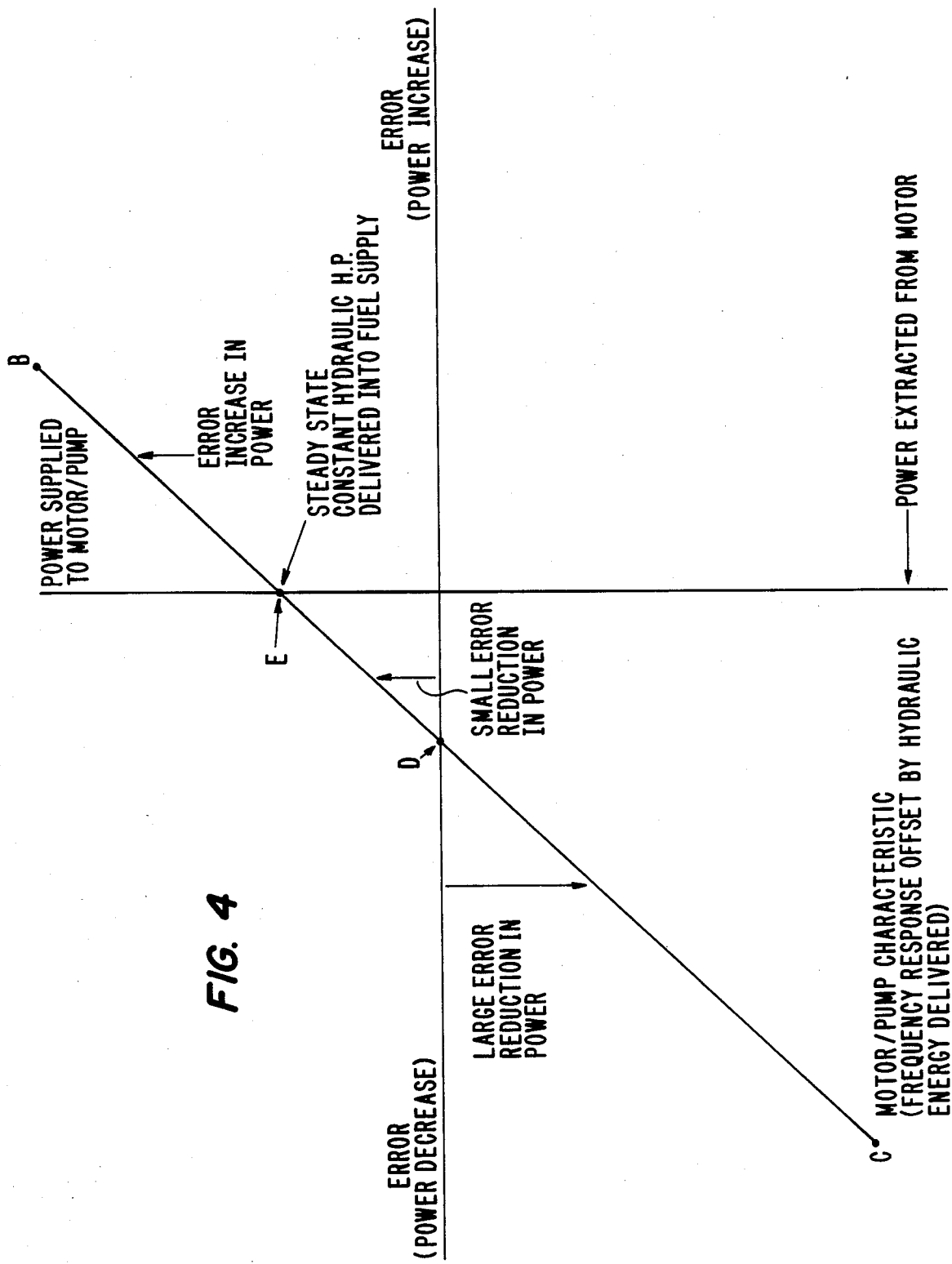
FIG. 4. illustrates a graph of power supplied/extracted by the motor and associated pump versus the error difference between the fuel supplied and fuel flow demand signal.

FIGS. 3A-C illustrate an electrical schematic of a preferred implementation of the speed controller 14 of FIG. 2. Conventional integrated circuits are identified by their industry designation. A series of boxes defined by dotted lines, which are identified by the same reference numerals used in FIG. 2, correlate the electrical circuitry of the schematic of FIG. 3 with the labelled blocks of FIG. 2. It should be understood that other implementations may be utilized in the practicing of the present invention. Resistance and capacitance values have been omitted.

FIG. 4 is a graph of a relationship between the power supplied or extracted to or from the motor/pump 16 and the difference between fuel supplied and fuel demand. The positive Y axis represents the power signal used in driving the electrically powered positive displacement fuel pump and motor 16 and the negative Y axis represents the power extracted from the system by braking. The abscissa is the difference between fuel supplied and fuel demand. A steady state rate of fuel demand is represented by the zero point on the X axis. When the fuel demand signal inputted into the engine speed controller 12 of FIG. 1 changes from a steady state at the zero point on the X-axis, the fuel demand signal moves along the characteristic CB along the X-axis in a positive or negative direction.

The power signal is applied to the electric motor of the positive displacement fuel pump and electric motor 16 when the rate of change of delivery of fuel specified by the fuel flow demand signal is operating in section DB which includes both decreases in the rate of delivery less than the predetermined rate of decrease and all increases in the rate of delivery. It should be understood that while a straight line characteristic is illustrated in FIG. 4, other fuel flow characteristics may be utilized with the present invention. When the pump controller 14 is operating in section DB, the output power signal from the flip-flop circuit 32 has a pulse repetition frequency equal to the pulse repetition frequency of clock 30 and a pulse width proportional to the sum of the outputs from integrator 22 and proportional amplifier 26. The outputting of pulses ceases as operation moves to point D and increases in direct proportion as the fuel demand moves along section DB away from point D. The braking signal is applied to the positive displacement fuel pump and electric motor 16 by the power driver 18 when the rate of decrease in the delivery of fuel is greater than point D in line section CD. When the pump controller 14 is operating along section CD, the output braking signal has a repetition frequency equal to the frequency of the clock 30 and a pulse width proportional to the magnitude of the output signal from proportional amplifier 26.

Figure 5:
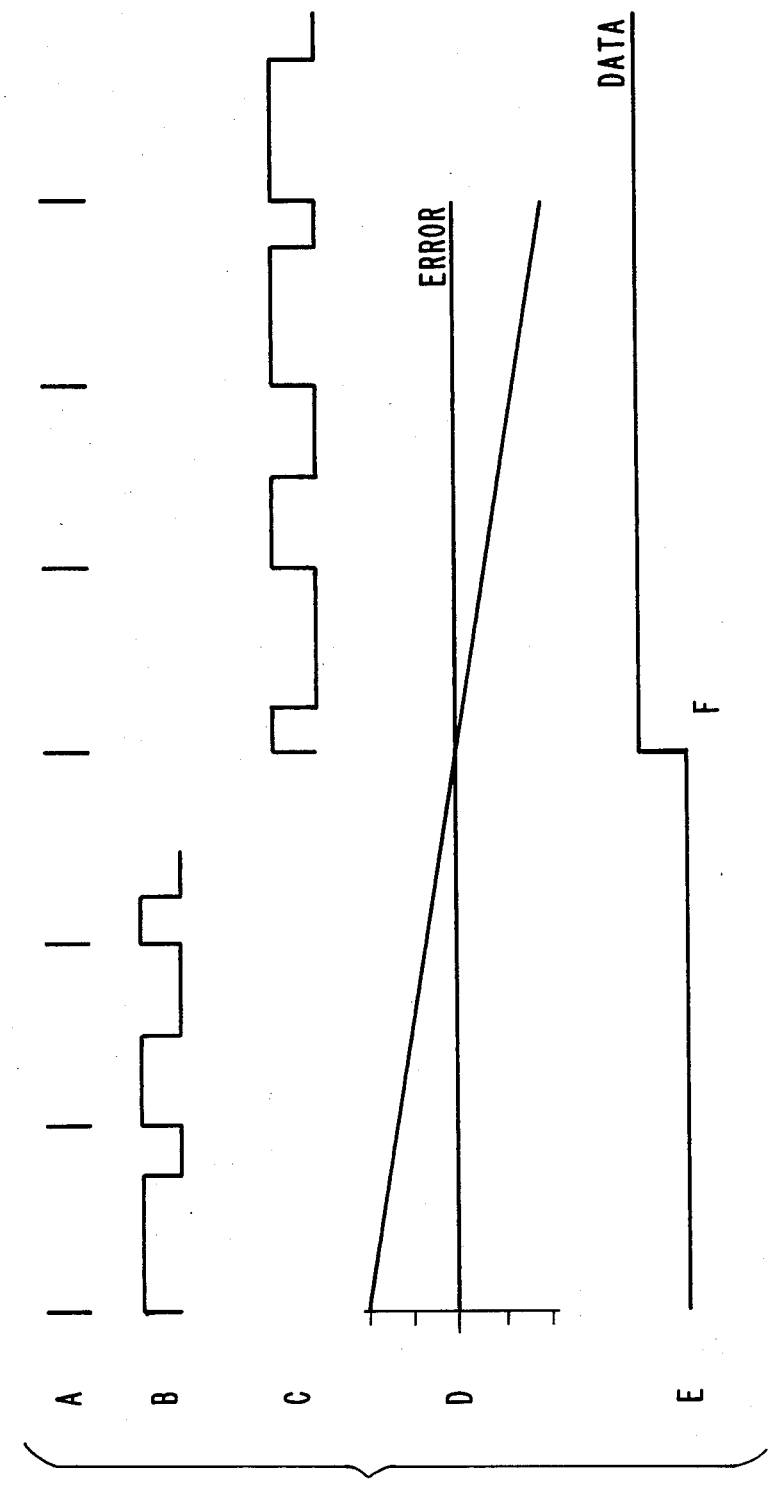
FIG. 5 illustrates various signals produced by the diagram of FIG. 2.

FIG. 5 illustrates a timing diagram of signals used to generate the braking or power signal applied to the positive displacement fuel pump and electric motor 16. The signals illustrated in FIG. 4 represent the signals used in the generation of an output from either the flip-flop circuits 32 or 42. The clock signal is illustrated in FIG. 5A which is a pulse train of a fixed frequency. FIG. 5B and 5C respectively illustrate the outputs of the pulse width control 40 and pulse width control 28 for an operational sequence moving along BC for an error signal as illustrated in FIG. 5D. Steady state is represented by the zero point with movement from the maximum positive value of the error signal to zero corresponding to proportionally smaller rates of change in fuel demand. Movement from the maximum negative value of the error signal to zero corresponds to proportionately smaller rates of increase in fuel demand. It should be noted that the duty cycle of the pulse of FIG. 5B goes to zero for a positive error signal as a consequence of the location of point D in FIG. 4 and that a zero error signal represents the inputting of power into the system as represented by the first pulse in FIG. 5C.

While the invention has been described in terms of its preferred embodiment, it should be understood that numerous modifications may be made thereto without departing from the spirit and scope of the invention. It is intended that all such modifications fall within the scope of the appended claims.

I claim:

1. An electrically powered fuel control for a gas turbine engine comprising:
   (a) an electrically powered fuel supply means for providing fuel to the gas turbine engine in response to a power signal, the fuel supply means providing an increased fuel supply to cause the engine to provide increased power and a decreased fuel supply to the engine to cause the engine to provide decreased power;
   (b) means for specifying fuel demand for the engine to selectively cause the increase in fuel supplied to the engine and the decrease in fuel supplied to the engine, the means for specifying producing a fuel flow demand signal which is proportional to the specified fuel demand;
   (c) sensing means for producing a signal which is proportional to a sensed velocity of a moving element in the electrically powered fuel supply means;
   (d) means for braking the rate of delivery of fuel by the electrically powered fuel supply means in response to a braking signal; and
   (e) control means, responsive to the velocity signal and the fuel flow demand signal, for producing the power signal to cause an increase in the supply of fuel delivered to the engine in response to the means for specifying fuel demand specifying an increase in the rate of delivery of fuel to the engine and for applying power to cause a decrease in the rate of delivery of fuel delivered to the engine less in magnitude than a predetermined rate of decrease, in response to the means for specifying fuel demand specifying a decrease in rate of delivery of fuel less than the predetermined rate of decrease and for producing the braking signal for causing the electrically powered fuel supply means to be braked by the means for braking to decrease the rate of delivery of fuel to the engine in response to the means for specifying fuel demand specifying a decrease in the rate of delivery of fuel greater than the predetermined rate of decrease in the rate of delivery.

2. An electrically powered fuel supply in accordance with claim 1 wherein:
   the means for braking the rate of delivery of fuel is a regenerative braking means.

3. An electrically powered fuel supply in accordance with claim 1 wherein the control means comprises:
   a pulse width modulation means, responsive to the velocity signal and the fuel flow demand signal, for supplying the power signal to said electrically powered fuel supply means, the power signal being comprised of a series of pulses which repeat at a given frequency and have a width which increases as an integral function of a difference between fuel flow demand signal and the velocity signal and as a function of the difference between the fuel flow demand signal and the velocity signal.

4. An electrically powered fuel supply in accordance with claim 1 wherein said control means comprises:
   (a) a pulse width modulation means, responsive to the velocity signal and the fuel flow demand signal, for supplying the power signal to the electrically powered fuel supply means, the power signal being comprised of a series of pulses which repeat at a given frequency and for increases in the rate of delivery of fuel and for decreases in the rate of delivery less than the predetermined rate have a width which increases as an integral function of the difference between the fuel flow demand signal and the velocity signal and as a function of the difference between the fuel flow demand signal and the velocity signal; and
   (b) a pulse width modulation means, responsive to the velocity signal and the fuel flow demand signal for supplying the braking signal to the means for braking, the braking signal being comprised of a series of pulses which repeat at a given frequency and have a width which increases as a function of the difference between the fuel flow demand signal and the velocity signal for decreases in the rate of delivery greater than the predetermined decrease in the rate of delivery.

5. An electrically powered fuel supply in accordance with claim 4 wherein a maximum rate of braking is produced by said braking signal being continually in an on state.

6. An electrically powered fuel supply in accordance with claim 4 wherein a maximum rate of increase in fuel demand is produced by the power signal being continually in an on state.

7. An electrically powered fuel supply in accordance with claim 4 wherein:
   the means for braking the rate of delivery of fuel is a regenerative braking means.

8. An electrically powered fuel supply in accordance with claim 2 wherein the regenerative braking means comprises:
   (a) an electric motor driving the electrically powered fuel supply means, the electric motor being operated as a generator of electrical current;
   (b) a resistance, coupled to an output of the electric motor operated as a generator of electric current; and
   (c) an electrically controlled switch having a control terminal to which the braking signal is applied, the switch having a pair of terminals through which current will flow upon application of the braking signal, one of the pairs of terminals being coupled to the resistance to control the flow of current through the resistance in accordance with the braking signal.

9. An electrically powered fuel supply in accordance with claim 8 wherein:
   said switch is a field effect transistor which has its source to drain path coupled to an output of the electric motor with the braking signal, produced by said control means, being applied to a gate electrode of the field effect transistor to switch the field effect transistor into an on state.

10. An electrically powered fuel supply in accordance with claim 1 wherein:
    the control means applies the power signal with a gain higher than a gain of the braking signal.

11. An electrically powered fuel supply in accordance with claim 10 wherein the gains are a function of the difference between the fuel flow demand signal and the velocity signal.

12. An electrically powered fuel control for a gas turbine engine comprising:
(a) an electrically powered fuel supply means for providing fuel to the gas turbine engine in response to a power signal, the fuel supply means providing an increased fuel supply to cause the engine to provide increased power and a decreased fuel supply to the engine to cause the engine to provide decreased power;
(b) means for specifying fuel demand for the engine to selectively cause the increase in fuel supplied to the engine and the decrease in fuel supplied to the engine, the means for specifying producing a fuel flow demand signal which is proportional to the specified fuel demand;
(c) sensing means for producing a signal which is proportional to a sensed velocity of a moving element in the electrically powered fuel supply means;
(d) means for braking the rate of delivery of fuel by the electrically powered fuel supply means in response to a braking signal; and
(e) control means, responsive to the velocity signal and the fuel flow demand signal, for producing the braking signal and the power signal for respectively controlling the electrically powered fuel supply means and the braking means in accordance with a response characteristic having three sections; in a first section the braking means being activated by the braking signal for rates of decrease of fuel greater than a predetermined rate of decrease of fuel specified by the means for specifying, in a second section the electrically powered fuel supply means being activated by the power signal for rates of decrease of fuel less than the predetermined rate of decrease specified by the means for specifying and in a third section the electrically powered fuel supply means being activated by the power signal for rates of increase of fuel specified by the means for specifying.

* * * * *